United States Patent
Shirriff et al.

[11] Patent Number: 6,145,094
[45] Date of Patent: Nov. 7, 2000

[54] TRANSACTION LOCKS FOR HIGH AVAILABILITY

[75] Inventors: Kenneth W. Shirriff, Mountain View; Declan J. Murphy, San Francisco, both of Calif.

[73] Assignee: Sun Microsystems, Inc., Palo Alto, Calif.

[21] Appl. No.: 09/076,423

[22] Filed: May 12, 1998

[51] Int. Cl.[7] .............................. G06F 11/00; G06F 13/00
[52] U.S. Cl. ............................. 714/11; 711/150; 710/200; 709/226; 709/229
[58] Field of Search ................................... 714/1, 2, 3, 4, 714/13, 25, 48, 11; 709/221, 225, 226, 228, 229, 232, 237, 208, 209; 711/150; 710/200

[56] References Cited

U.S. PATENT DOCUMENTS

| | | | |
|---|---|---|---|
| 5,463,733 | 10/1995 | Forman et al. | 714/10 |
| 5,544,353 | 8/1996 | Forman et al. | 707/8 |
| 5,666,479 | 9/1997 | Kashimoto et al. | 714/2 |
| 5,692,120 | 11/1997 | Forman et al. | 714/10 |
| 5,796,934 | 8/1998 | Bhanot et al. | 714/4 |
| 5,852,724 | 12/1998 | Glenn, II et al. | 709/239 |
| 5,941,999 | 8/1999 | Matena et al. | 711/162 |

OTHER PUBLICATIONS

Thomas Becker, "Transparent Service Reconfiguration After Node Failure," Configurable Distributed Systems, p. 212–223, 1992.

U.S. application No. 08/829,156, Matena et al., filed Mar. 31, 1997, pending application.

U.S. application No. 08/884,978, Murphy et al., filed Jun. 30, 1997, pending application.

U.S. application No. 08/879,150, Tucker et al., filed Jun. 19, 1997, pending application.

U.S. application No. 08/879,151, Tucker et al., filed Jun. 19, 1997, pending application.

U.S. application No. 09/058,406, Murphy et al., filed Apr. 9, 1998, pending application.

*Primary Examiner*—Robert W. Beausoliel, Jr.
*Assistant Examiner*—Christopher A Revak
*Attorney, Agent, or Firm*—Park & Vaughan LLP

[57] ABSTRACT

One embodiment of the present invention provides a method and an apparatus that ensures proper semantics for operations when operations are restarted on a secondary server in the event of a failure of a primary server. This embodiment keeps a record on the secondary server of which operation currently has exclusive access to a shared resource. The method operates by receiving a message from the primary server indicating that a first operation on the primary server has acquired exclusive access to the shared resource. In response to this message, the system updates state information, at the secondary server, to indicate that the first operation has exclusive access to the shared resource and that any prior operations have completed their exclusive accesses to the shared resource. Upon receiving notification that the primary server has failed, the secondary server is configured to act as a new primary server. When the secondary server subsequently receives an operation retry request from a client of the primary server, it performs one of several operations. If the operation retry request is for the first operation, the system knows the first operation had exclusive access to the shared resource on the primary server. In this case, the secondary server acquires exclusive access to the shared resource, and completes the first operation. If the operation retry request is for a prior completed operation, the system returns to the client a saved result of the prior operation if the client has not received such saved result. Another embodiment of the present invention includes more that one secondary server.

33 Claims, 8 Drawing Sheets

TRANSACTION LOCKS FOR HIGH AVAILABILITY

RELATED APPLICATIONS

This application is related to the following commonly-assigned U.S. patent applications: Ser. No. 08/829,156 to Matena, et al., filed Mar. 31, 1997, pending; and Ser. No. 09/058,406 to Murphy, et al., filed Apr. 9, 1998, pending; the disclosures of which are incorporated herein by reference for all purposes as if set forth in full.

BACKGROUND

1. Field of the Invention

The present invention relates generally to distributed operating systems, and more particularly to method and an apparatus for ensuring proper semantics for operations when operations are restarted after a node failure in a highly available networked computer system.

2. Related Art

As computer networks are increasingly used to link stand-alone computer systems together, distributed operating systems have been developed to control interactions between multiple linked computer systems on a computer network. Distributed operating systems generally allow client computer systems to access resources on server computer systems. For example, a client computer system can usually access information contained in a database on a server computer system. However, when the server fails, it is desirable for the distributed operating system to automatically recover from this failure. Distributed computer systems possessing the ability to recover from such server failures are referred to as "highly available systems," and data objects stored on such highly available systems are referred to as "highly available data objects."

To function properly, the highly available system must be able to detect a server failure and to reconfigure itself so that accesses to objects on the failed primary server are redirected to backup copies on a secondary server. This process of switching over to a backup copy on the secondary server is referred to as a "failover."

One problem with restarting failed operations is that the primary server may have generated some external effects while performing an operation, and these effects may interfere with restarting the operations. For instance, consider a file system with a remove operation that removes a file from stable storage (e.g. disk) if the file exists, and otherwise returns an error. If the primary server fails after removing the file and the operation is restarted on the secondary server, the secondary server will find the file missing and will return an error. Thus, some operations cannot be simply repeated, i.e., the operations are not idempotent.

One solution to this problem is to send a checkpoint message from the primary server to the secondary server that contains enough data for a repeated operation to be performed correctly. For instance, in the previous example, the primary server can send a message to the secondary server stating whether or not the file exists. If the primary server fails and the secondary server receives the operation, the secondary server can check if the file exists. If the file does not currently exist, but the file existed on the primary server, the secondary server can conclude that the primary server completed the operation and can return success. Thus, the checkpointed data makes it possible for the secondary server to test if the operation completed on the primary server.

This approach will succeed if there is only one outstanding operation from the one or more clients. However, to improve system performance, it is often desirable to keep multiple operations in progress at one time for the one or more clients. In this case, operations may not be correctly restartable, even with the above-mentioned testing approach. For instance, suppose a first client sends a first operation to create a file while a second client sends a second operation to remove the same file. The primary server, when performing the first operation, will send a checkpoint to the secondary server saying the file does not currently exist. Suppose the primary server fails at this point and the operations are redirected to the secondary server. If the file create operation is restarted first, the secondary server will detect correctly that the primary server created the file and proper semantics will be preserved. However, if the remove operation is restarted first, the newly-created file will be successfully removed. Then, when the create operation is restarted, the secondary server will detect the absence of the file, will incorrectly conclude that the primary did not create the file, and will perform the create operation. In this case, the file will exist even though the remove operation apparently succeeded. This situation is a case of improper semantics.

Even if the operations are restarted in their original order, multiple operations can still cause problems. For instance, consider the three operations "rename file A to C," "rename file B to A" and "rename file C to B." If these three operations take place, files A and B will have traded places. If these three operations are restarted, the secondary server cannot simply test for the existence of files A and B to determine if the operations completed or not, since A and B will exist in either case. If the secondary server makes the wrong decision, the files A and B may be swapped twice or not at all. Thus, in the case where multiple operations occur simultaneously, making operations testable is not sufficient to ensure proper semantics. The above-mentioned problem does not arise for a single server because locking can be performed on the single server to ensure proper semantics on a single server. Providing such locking across multiple servers in a highly available system is possible, but it can greatly impede system performance.

What is needed is a method and an apparatus that ensures proper semantics when operations are restarted after a node failure in a highly available system.

SUMMARY

One embodiment of the present invention provides a method and an apparatus that ensures proper semantics for operations when operations are restarted on a secondary server in the event of a failure of a primary server. This embodiment keeps a record on the secondary server of which operation currently has exclusive access to a shared resource. The method operates by receiving a message from the primary server indicating that a first operation on the primary server has acquired exclusive access to the shared resource. In response to this message, the system updates state information, at the secondary server, to indicate that the first operation has exclusive access to the shared resource and that any prior operations have completed their exclusive accesses to the shared resource. Upon receiving notification that the primary server has failed, the secondary server is configured to act as a new primary server. When the secondary server subsequently receives an operation retry request from a client of the primary server, it performs one of several operations. If the operation retry request is for the first operation, the system knows the first operation had exclusive access to the shared resource on the primary server. In this case, the secondary server acquires exclusive access to the shared resource, and completes the first operation. If the operation retry request is for a prior completed operation, the system returns to the client a saved result of the prior operation if the client has not received such saved result. Another embodiment of the present invention includes more that one secondary server.

In a variation on the first embodiment, if the operation retry request is for other than the first operation or a prior operation, the system waits for the operation that currently holds exclusive access to the shared resource to complete before processing the operation retry request. If the system discovers that the client that initiated the first operation has failed, the system releases the first operation's exclusive access to the shared resource. When the system receives an indication that the client has received a reply for the first operation, the system updates state information, at the secondary server, to indicate that the client has received the reply. Finally, when the secondary server receives an indication that the first operation has released its exclusive access to the shared resource, the secondary server updates state information to indicate that the first operation has released its exclusive access. This updating may include discarding state information associated with the first operation.

Several optimizations are possible to the above embodiments. First, the primary server does not have to send the operation result in the event of success; success can be assumed if no result message is sent. Second, if the result message is not success, the result message does not have to be sent immediately, but can be "piggybacked" on the next message.

After the primary server fails, and the secondary server takes over, the secondary server can fully assume the role of the primary server and use another node as a new secondary server. The system continues to operate in this case, ensuring that if the former secondary server fails, operations will be restarted correctly on the new secondary server.

In a further embodiment, the present invention ensures exclusive access to a file system at the directory level. This allows operations to take place on different directories in parallel, while ensuring atomicity of operations on a single directory.

DETAILED DESCRIPTION OF THE INVENTION

DEFINITIONS

Failover—The process of switching from a primary copy of an object on a first server to secondary copy of the object on a second server when the first server fails.

Failure of a Server—a condition that occurs when a server fails to respond to a request from a client in a timely manner.

Object—any data object, or more narrowly an object defined within an object-oriented programming environment.

Replica Manager—a process or mechanism that keep track of the various primary and secondary copies of an object on various servers.

Retrying Transparently—retrying an invocation to an object without explicit retrying by the client application program.

Transparent Failover—A failover that occurs automatically, without explicit failure detection and retry commands from a client application program.

Winding up Invocations to an Object—waiting for any active invocations to the object to complete. This may additionally include tearing down data structures associated with invocations to the object.

DESCRIPTION OF DISTRIBUTED SYSTEM

Figure 1:
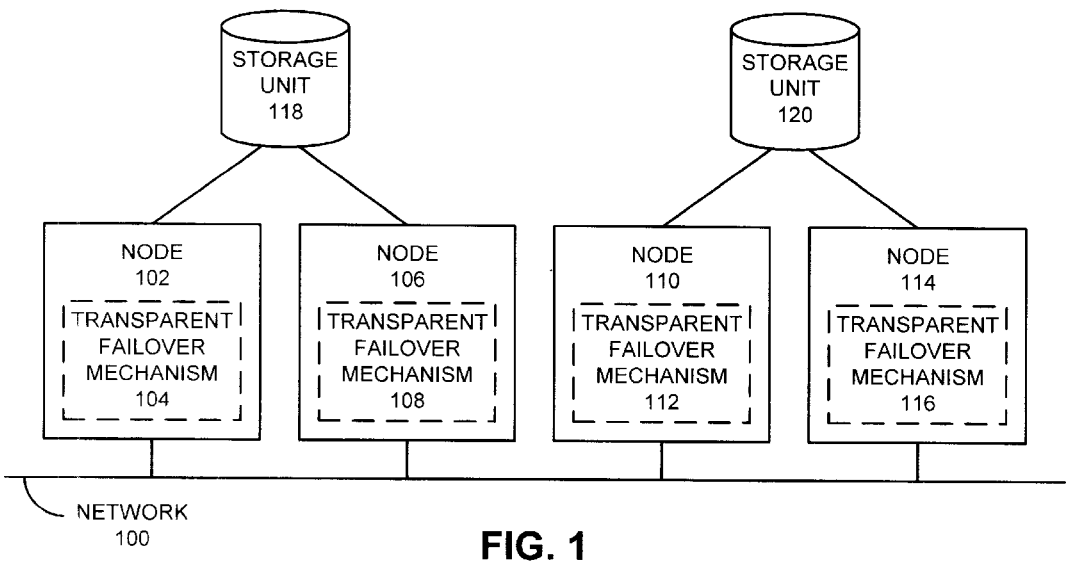
FIG. 1 is a diagram illustrating a distributed computing system including a plurality of nodes 102, 106, 110 and 114, which can functions as either client and/or server systems in accordance with an embodiment of the present invention.

FIG. 1 is a diagram illustrating a distributed computing system including a plurality of nodes 102, 106, 110 and 114, which can function as either client systems and/or server systems in accordance with an embodiment of the present invention. The system illustrated in FIG. 1 includes network 100, which is coupled to nodes 102, 102, 106, 110 and 114. Network 100 generally refers to any type of wire or wireless link between computers, including, but not limited to, a local area network, a wide area network, or a combination of networks. Nodes 102, 106, 110 and 114 use network 100 to communicate with each other. Each of nodes 104, 106, 110 and 114 represent independent client/server systems, wherein each node can function as a client and/or a server computer system. A client computer system is associated with a node that invokes an object. A server computer system is associated with a node that stores the object's methods and/or data. In certain cases, the client and server for an object exist on the same node. In other cases, the client and server will exist on distinct nodes.

FIG. 1 includes storage units 118 and 120. Nodes 102 and 104 are coupled to storage unit 118. Nodes 110 and 114 are coupled to storage unit 120. Storage units 118 and 120 include non-volatile storage for data from nodes 102, 106, 110 and 114. (Note that in general nodes may include no storage units or they may include multiple storage units.)

Each node 102, 106, 110 and 116 has one or more domains. A domain is defined to be a process with its own address space. A domain can have multiple threads of execution, which can execute user or kernel application procedures. A kernel domain is associated with the operating system and a user domain is associated with a process other than the operating system. User domains typically execute one or more user application procedures. Each domain has zero or more objects associated with it.

In one embodiment, the operating system is the Solaris operating system, which is a product of Sun Microsystems, Inc. of Palo Alto, Calif. The Solaris operating system is a UNIX-based operating system. Hence, in describing the present technology, UNIX terminology and concepts are frequently used. However, this usage is for purposes of illustration and is not to be construed as limiting the invention to this particular operating system.

Each thread can request the execution of an object (i.e., object's method). The location of the object is transparent to the thread. The object can reside in one of several locations. It can reside within the same domain as the requesting thread, in a different domain but within the same node as the requesting thread, or in the domain of a remote node.

A kernel domain has multiple threads that can execute kernel applications. Each kernel domain can have one or more kernel objects associated with it. A kernel object can be invoked by a thread within its domain or by a thread in a domain in another node.

The execution of a method for an object within the domain of the requesting application is treated as a local procedure call. The local procedure call is typically a function or subroutine call that transfers control from the application to the object's method, and eventually returns control to the application. The arguments associated with the object are passed through the local procedure call.

The execution of a method for an object that resides in a remote domain is treated as a remote procedure call. The remote procedure call is handled by the object request broker (ORB), which is a distributed mechanism for handling remote procedure calls. Thus, the ORB invokes methods for objects residing in different domains from the requesting application. These remote objects can be situated in the same node as the requesting application, or in a different node.

DESCRIPTION OF CLIENT-SERVER INTERACTIONS

Figure 2A:
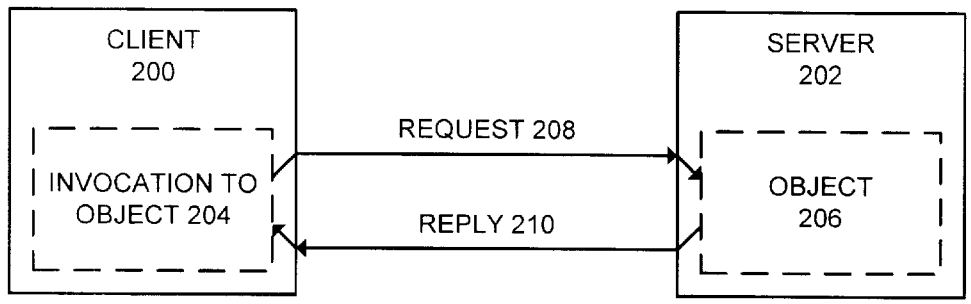
FIG. 2A illustrates prior art client-server interactions involved in an invocation to an object 206 in a non-highly available system.

FIG. 2A illustrates prior art client-server interactions involved in an invocation to an object 206 in a non-highly available system. In this embodiment, client 200 makes a reference to object 206 on server 202. Generally, this reference is in the form of an invocation of object 206.

In this embodiment, client 200 performs the invocation as follows. Client 200 makes an invocation 204 to object 206 on server 202. This generates a request 208 across network 100 to server 202. In response to request 208, server 202 calls a specified function on object 206. After this function call completes, server 202 returns a reply 210 across network 100 to client 200. The object invocation 204 is now complete.

Figure 2B:
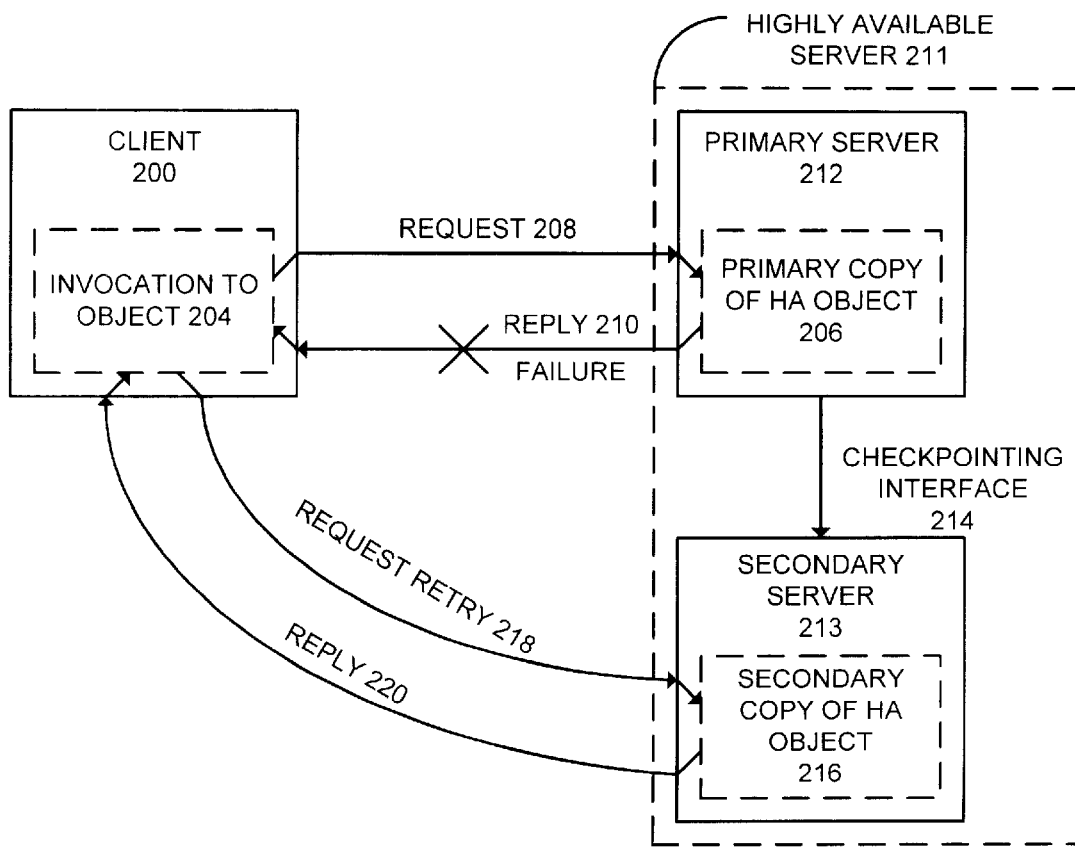
FIG. 2B illustrates client-server interactions involved in an invocation to a highly available object 206 on a highly available server 211 in accordance with an embodiment of the present invention.

FIG. 2B illustrates client-server interactions involved in an invocation to a highly available object 206 on a highly available server 211 in accordance with an embodiment of the present invention. Highly available server 211 includes a primary server 212 and a secondary server 213. Primary server 212 includes a primary copy of the highly available object, and secondary server 213 includes a secondary copy of the highly available object. Consistency is maintained between primary and secondary copies of the highly available object through communications across checkpointing interface 214.

The client-server interactions proceed in essentially the same way as in FIG. 2A, except that highly available server 211 continues to function even if primary server 212 becomes unresponsive or otherwise fails. First, client 200 makes an invocation 204 to the object. This causes a request 208 to be generated across network 100 to primary server 212. If primary server 212 for some reason becomes unresponsive, the reply 210 fails. This indicated by the cross on FIG. 2B.

When a failure occurs, the failure will eventually be detected by a system process called the replica manager 500, which is described in more detail with reference to FIG. 5 below. Replica manager 500 initiates a chain of events that cause software within client 200 to automatically retry the invocation to secondary server 213. This generates a retry request 218 to secondary server 213. In response to retry request 218, secondary server 213 calls the specified function on the secondary copy of the object 216. After the function call completes, server 213 returns a reply 220 across network 100 to client 200. The object invocation 204 is now complete.

DESCRIPTION OF SYSTEM LAYERS

Figure 3:
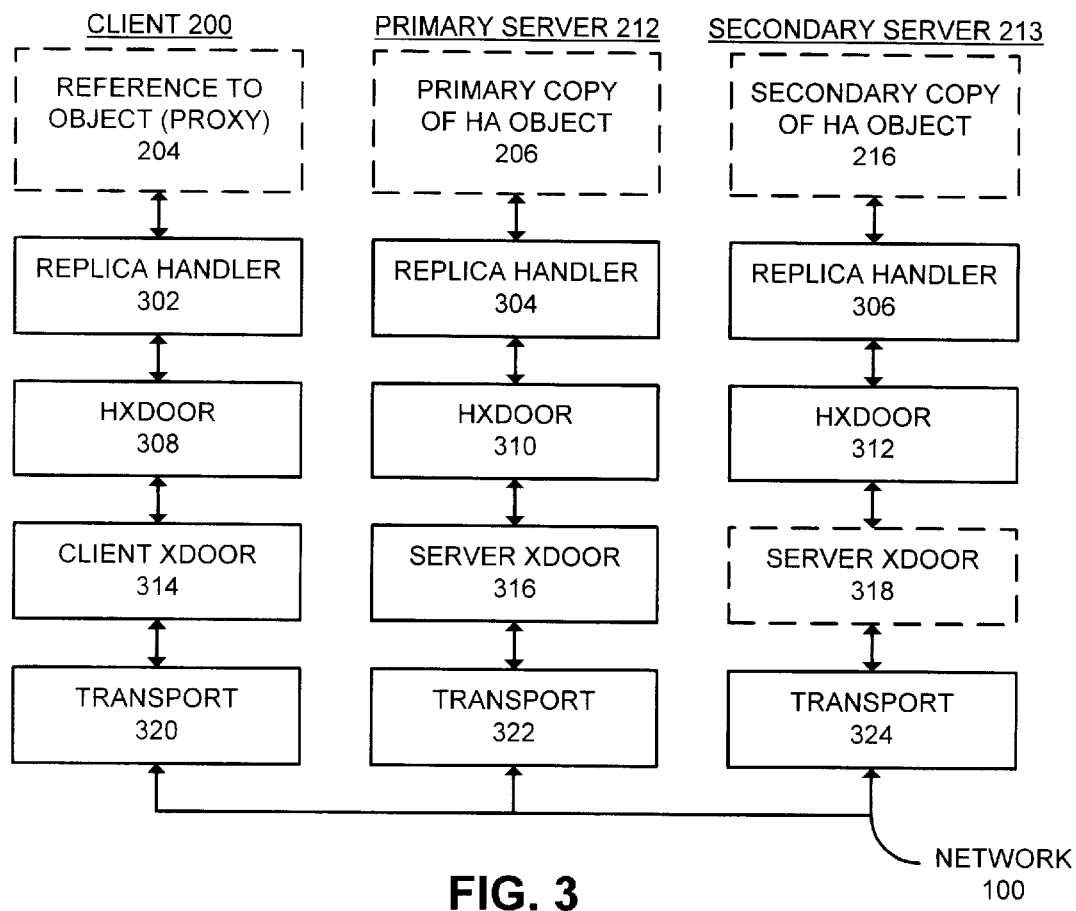
FIG. 3 illustrates various system layers involved in communications between client 200, primary server 212 and secondary server 213 in accordance with an embodiment of the present invention.

FIG. 3 illustrates various system layers involved in communications between client 200, primary server 212 and secondary server 213 in accordance with an embodiment of the present invention. On client system 200, invocation 204 to the object is handled by a proxy that forwards the reference to replica handler 302. A replica handler, such as replica handler 302, controls the basic mechanism of object invocation and argument passing. A replica handler controls how an object invocation is implemented, how object references are transmitted between address spaces, how object references are released, and similar object runtime operations.

Replica handler 302 forwards the reference to hxdoor 308. In one embodiment, this reference passing is accomplished through a function call. Hxdoor 308 is an intermediate layer interposed between replica handler 302 and client xdoor 314. The data structures underlying hxdoor 308 are described in more detail below with reference to FIG. 4. Hxdoor 308 passes the reference to client xdoor 314.

Client xdoor 314 forwards the reference to transport mechanism 320, which forwards the reference in the form of a request across network 100 to transport mechanism 322 on primary server 212. Within primary server 212, this request propagates upwards in the reverse order through, server xdoor 316 and hxdoor 310 to replica handler 304. Finally, replica handler 304 applies the request to the primary copy of highly available object 206 so that the invocation is performed on highly available object 206. Next, a reply is sent back along to same path to client 200.

The state of a secondary copy 216 of the highly available object on secondary server 213 is then updated through checkpointing interface 214. This updating process is described in more detail in a related patent, entitled "Method and System for Achieving High Availability in Networked Computer Systems," by inventor(s), Matena, et al., having Ser. No. 08/829,156, which is referenced and incorporated by reference in the related application sections above. Note that secondary server 213 includes replica handler 306, hxdoor 312, server xdoor 318 and transport mechanism 324. In the illustrated embodiment, server xdoor 318 (which appears in dashed lines) is not created until a failover occurs. In this way, creation of server xdoor 318 is delayed until it is necessary.

DESCRIPTION OF DATA STRUCTURES

Figure 4:
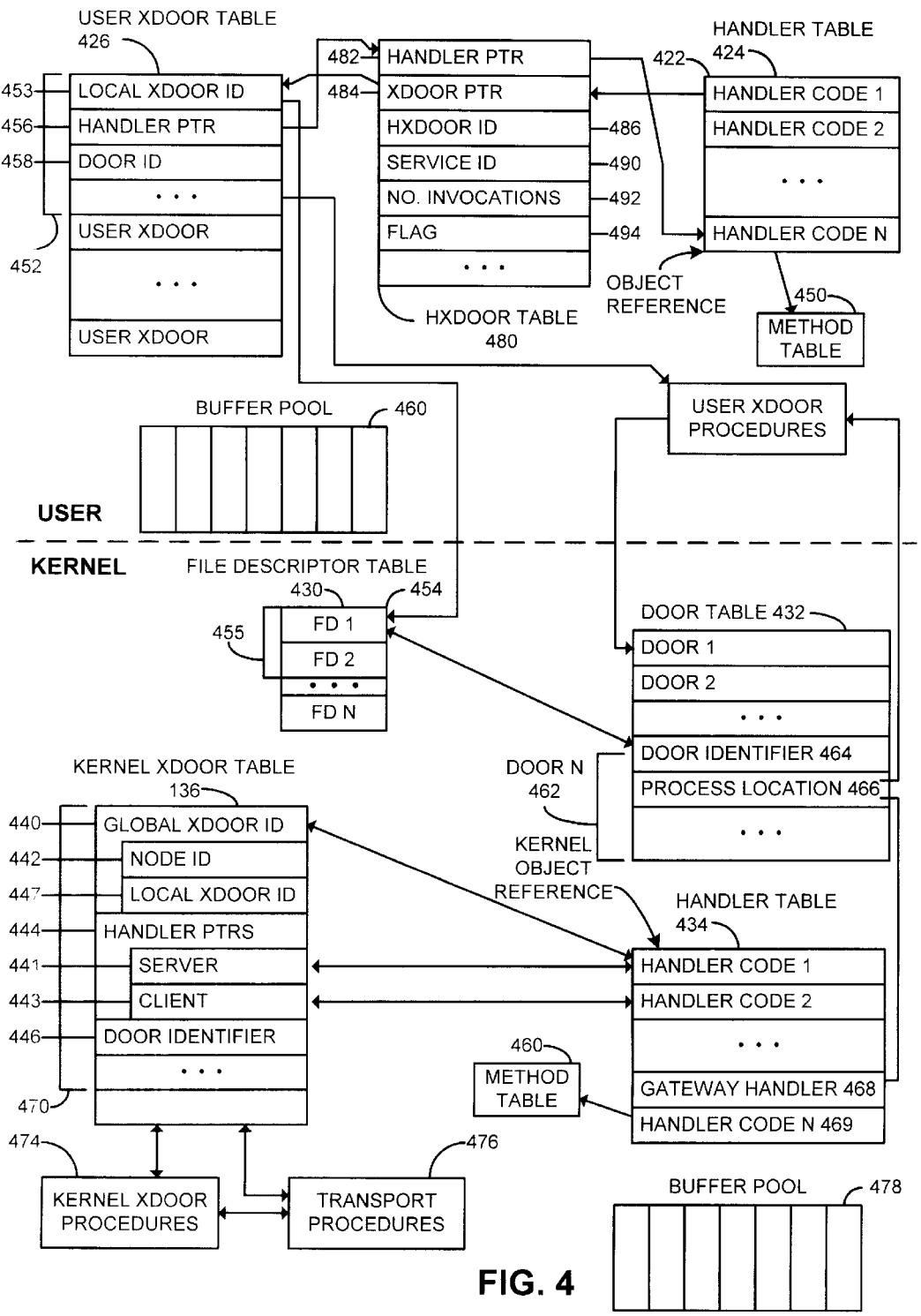
FIG. 4 illustrates some of the data structures involved in invocations to remote objects in accordance with an embodiment of the present invention.

FIG. 4 illustrates some of the data structures involved in invocations to remote objects in accordance with an embodiment of the present invention. Objects that are accessible by remote nodes have a xdoor 470 identified by a global xdoor identifier 440 that is used to uniquely identify the object within a particular node. In addition, each node is uniquely represented by a node identifier 442 that uniquely identifies the node within the distributed system. The global xdoor identifier 440 is coupled with the node identifier 442 to produce an identifier that uniquely identifies the object within the distributed system.

An application references an object utilizing a local xdoor identifier or file descriptor. In order to execute a remote object invocation, the ORB references the object using the server's file descriptor for that object. Thus, the ORB maps the client's object reference (i.e., local xdoor identifier) into the server's local xdoor identifier. This mapping is performed utilizing a number of procedures and data structures that reside in both the user and kernel domains.

The ORB utilizes several mechanisms to perform this mapping. The ORB includes the following procedures: handler procedures, xdoor procedures, and gateway handler procedures. The xdoor procedures reside in both the user and kernel domains. A brief description of these mechanisms is provided below with reference to FIG. 4.

An object is referenced by a handler procedure 422. Replica handlers 302, 304 and 406 are example of such a handler. Handler procedure 422 controls the basic mechanism of object invocation and argument passing. Handler procedure 422 controls how an object invocation is implemented, how object references are transmitted between address spaces, how object references are released, and similar object runtime operations. For local object invocations, handler 422 executes a local procedure call to the object's method 450.

Handler table 422 points to hxdoor table 480. Hxdoor table 480 is used by a correspond hxdoor. As mentioned above, an hxdoor is an intermediate layer between a replica handler and a xdoor that provides a level of indirection to facilitate high availability. To a replica handler, the hxdoor appears to be a xdoor. To a xdoor the hxdoor appears to be a replica handler.

Hxdoor table 480 includes an hxdoor ID 486, a service ID 490, a number of invocations 492 and a flag 494. The hxdoor ID identifies the particular hxdoor. The service ID 490 identifies a particular service, wherein a service is defined to be a group of objects. The number of invocations 492 keeps track of the number of uncompleted invocations currently outstanding to the service. Finally, the flag 494 indicates whether the hxdoor is on a client, a primary server or a secondary server.

For remote user object invocations, an object is represented in its domain by a user-level xdoor 452. A user-level xdoor 452 consists of a local xdoor identifier 453, a pointer to an appropriate handler 456, a door identifier 458, and other information. In one embodiment of the present invention, the local xdoor identifier 453 is a file descriptor. The door identifier 458 corresponds to a door representing the object and it is stored in the kernel-level door table 432.

A kernel-level xdoor 470 is a kernel state entity that is used to represent an object throughout the distributed system. The kernel-level xdoor 470 possibly includes a global xdoor identifier 440, handler pointers 444 (including a server handler pointer 441 and a client handler pointer 443), and a door identifier 446. Global xdoor identifier 440 is used to uniquely identify the object within the distributed system. It includes a node identifier 442 and a local xdoor identifier 447 for referring to a xdoor within a node. Door identifier 446 is used to identify the corresponding door 462.

There are two types of xdoors: a client xdoor and a server xdoor. Only client xdoors include a node identifier, such as node identifier 442, and only server xdoors include server handlers, such as the server hander pointed to by server handler pointer 441.

A door is a kernel state entity. It exists only for intra-node remote user objects (i.e., an intra-node remote user object is an object that resides in a different domain within the same node as the requesting domain). A door is represented by a file descriptor. Each user domain has a user xdoor table that stores the file descriptors of those objects accessible by threads associated with the domain. A user domain references a remote object through a file descriptor, located in the domain's user xdoor table, which is mapped into the actual door. Doors do not reside in the address space of the user accessible domains, but rather in the kernel domain.

The use of a file descriptor to represent a door provides a secure mechanism to control the objects that a user can invoke. A file descriptor is a protected kernel state and as such cannot be forged by a user. The possession of a file descriptor indicates that an application has permissible access to an object. The domain that generates the object becomes a server for the object and its door. The server exports object references to those applications that it wishes to have access to the object. In this manner, there is a secure mechanism to selectively control the applications that can access the objects within the distributed system.

An object can have a number of file descriptors associated with it. These file descriptors can reside in the same domain as the object, or alternatively, in different domains having access to the object. Each client domain that references a remote object has one or more file descriptors representing the object. In essence, the file descriptor is a local identifier for the object within a particular user domain.

A kernel object is represented in the kernel domain by a kernel-level xdoor 470. A kernel object's xdoor 470 contains an additional field that includes a local xdoor identifier 447 representing the kernel object in the kernel domain. Typically, the local xdoor identifier 447 is a file descriptor 454.

A kernel-level file descriptor table 430 is used to store each file descriptor 454 existing within a node 402. The file descriptor table 430 is partitioned into segments 455. Each segment represents the file descriptors 454 associated with a particular domain. Each file descriptor entry 454 references a door stored in a kernel-level door table 432. A door 462 includes a door identifier 464, a process location pointer 466, and other information. The process location pointer 466 reflects an entry point to a procedure in the server's address space that is used to perform the invocation. In the case of an intra-node remote user object invocation, process location pointer 466 is used to access the server's xdoor procedures 428. In the case of an inter-node remote object invocation or a remote kernel object invocation, process location pointer 466 is used to access a gateway handler 468 associated with the object. Gateway handler 468 is used to facilitate the transport of the remote object invocation request to the corresponding node. Gateway handler 468 translates object invocations utilizing file descriptors 454 to a respective system-wide identifier.

DESCRIPTION OF REPLICA MANAGER

Figure 5:
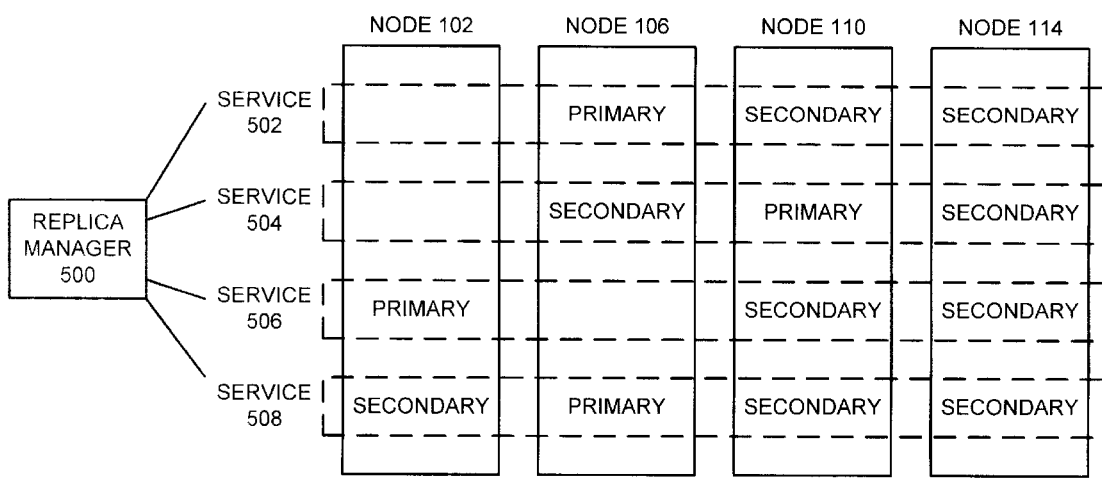
FIG. 5 illustrates how replica manager 500 keeps track of primary and secondary servers for various services in accordance with an embodiment of the present invention.

FIG. 5 illustrates how replica manager 500 keeps track of a primary server and zero or more secondary servers for various services in accordance with an embodiment of the present invention. For each service, replica manager 500 keeps a record of which nodes in a distributed system function as primary servers, and which nodes function as secondary servers. (Recall that a service is a related collection of objects.) For example, in FIG. 5 replica manager 500 keeps track of services 502, 504, 506 and 508. The primary server for service 502 is node 106, and the secondary servers are nodes 110 and 114. The primary server for service 504 is node 110, and the secondary servers are nodes 106 and 114. The primary server for service 506 is node 102, and the secondary servers are nodes 110 and 114. The primary server for service 508 is node 106, and the secondary servers are nodes 102, 110 and 114.

In one embodiment of the present invention, replica manager 500 is distributed across multiple nodes of the network, so that replica manager 500 will continue to function even if one of the nodes on the network fails.

DESCRIPTION OF STATE INFORMATION MAINTAINED FOR LOCK CHECKPOINTING

Figure 6:
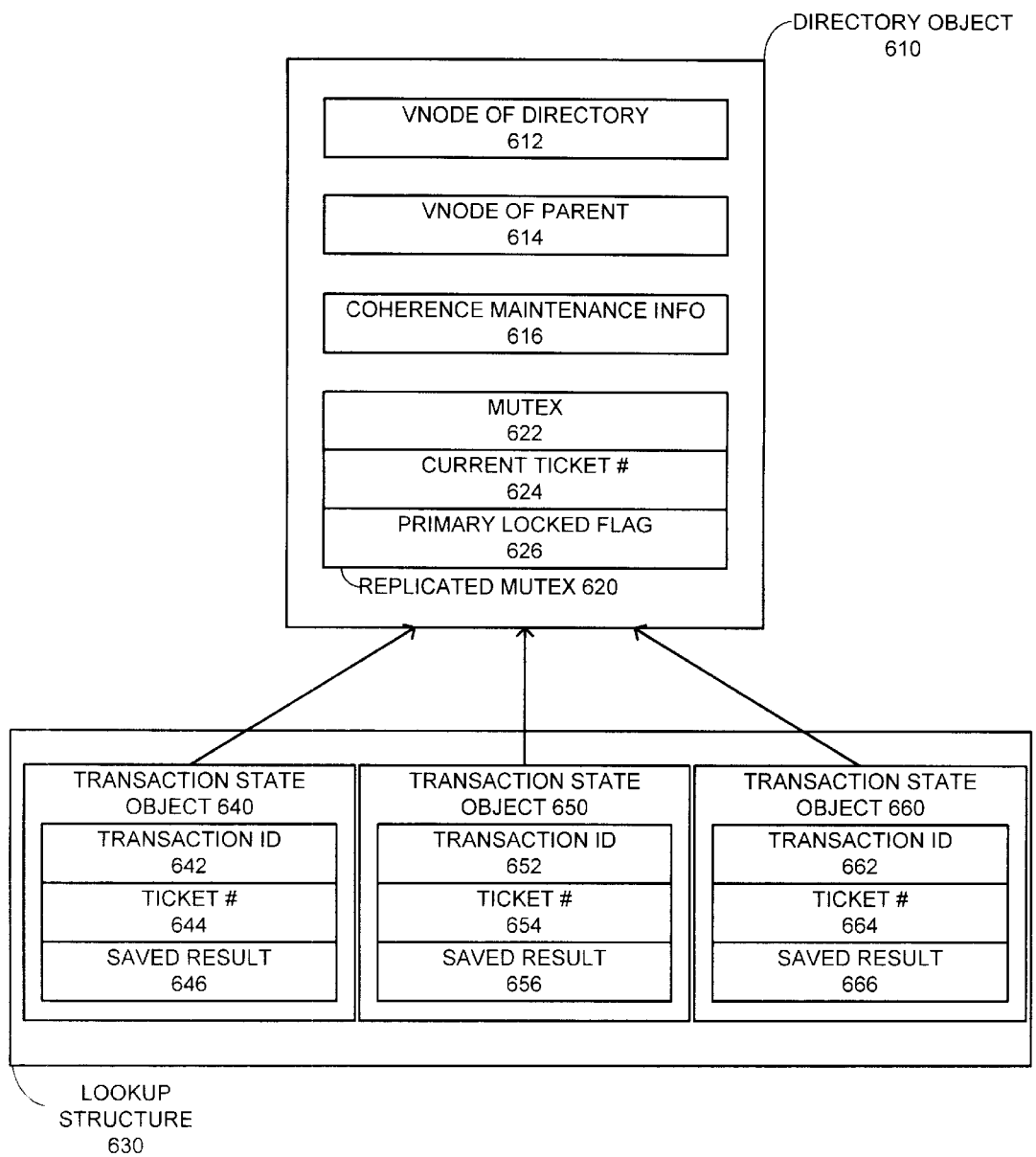
FIG. 6 is a block diagram illustrating how state information is stored on secondary server 213 to assure mutual exclusion for a shared resource during a failure of primary server 212 in accordance with an embodiment of the present invention.

FIG. 6 is a block diagram illustrating how state information is stored on secondary server 213 to assure mutual exclusion for a shared resource during a failure of primary server 212 in accordance with an embodiment of the present invention. The embodiment illustrated in FIG. 6 performs directory-level locking on a file system. To this end, FIG. 6 includes a directory object 610. However, in general the present invention can be applied to any shared resource in a distributed system. This may include, but is not limited to, shared storage at the individual file or file system level, as well as other shared resources, such as a name server.

A directory object 610 is created whenever a directory is accessed for the first time. This directory object 610 is cached so that it can be referenced as needed. The directory object will ultimately be discarded when it is flushed from the cache. As illustrated in FIG. 6, directory object 610 includes vnodes 612 and 614 (a vnode is virtualized version of an inode). Vnode 612 maintains state information for the directory being accessed, whereas vnode 614 maintains state information for the parent of the directory being accessed.

Directory object 610 additionally includes coherence maintenance information 616, which includes object references to clients with cached copies of the directory as well as bitmaps of the cached state. These bitmaps may include information such as whether the local copy of the directory is dirty or clean. The system uses coherence maintenance information 616 to maintain coherency between copies of information associated with the directory spread throughout the distributed system.

Directory object 610 additionally includes replicated mutex 620, which includes state information to implement a distributed mutual exclusion system for accesses to the directory. In the illustrated embodiment, replicated mutex 620 includes a standard mutual exclusion variable 622, current ticket number 624 and primary locked flag 626. Current ticket number 624 is used to keep track of which transaction has exclusive access to the shared resource. Primary locked flag 626 indicates whether or not primary server 212 presently has a lock on the directory.

Directory object 610 is typically associated with a number of transaction state objects. Each client operation has a separate transaction state object. These transaction state objects contain information on transactions that have accessed the directory. Transaction state objects are discarded when the client operation completes, or if the client fails. In either of these cases, secondary server 213 receives an "unreferenced" message indicating that the client no longer requires the operation to be performed. In the illustrated embodiment, directory object 610 is associated with transaction state objects 640, 650 and 660. Transaction state objects 640, 650 and 660 are stored in lookup structure 630, which allows transaction state objects 640, 650 and 660 to be looked up based upon transaction identifiers (IDs). Transaction state objects 640, 650 and 660 include transaction IDs 642, 652 and 662, respectively, which uniquely identify their associated transactions. Transaction state objects 640, 650 and 660 also include ticket numbers 644, 654 and 664, respectively, which are used to determine which transaction presently holds exclusive access to the directory. Transaction state objects 640, 650 and 660 also include saved results 646, 656 and 666, respectively, which store results of transactions in case they need to be resent to a client.

The above described data structures are generally used as follows. When secondary server 213 receives a notification that a transaction on primary server 212 has assumed exclusive access to the directory, secondary server 213 increments current ticket number 624 to produce a new ticket number. This new ticket number is stored in the state object for the transaction.

If primary server 212 fails, secondary server 213 is configured to take over for primary server 212. When secondary server 213 subsequently receives a retry request from a client with an uncompleted transaction to primary server 212, secondary server 213 determines if the transaction presently has exclusive access to the shared resource. It does so by looking up the ticket number in the state object for the transaction and comparing the ticket number with current ticket number 624. If the transaction currently has exclusive access to the shared resource, the transaction is allowed to proceed. If the transaction has not been granted exclusive access to the directory yet, the transaction waits for a transaction that currently holds exclusive access to complete. If the transaction has already completed, a transaction result is resent to the client.

Other types of variables may be used to keep track of the state object. For example, the ticket number in the state object can be replaced with a variable holding values of "lock_currently_active", "old_lock" or "lock_not_acquired". These values correspond to the transaction's ticket number equaling the current ticket number, the transaction's ticket number being less than the current ticket number, and the condition where the transaction has not yet acquired the lock, respectively. If a state object always immediately acquires a lock, then the lock_not_acquired case can be dropped, and the variable can be a boolean.

The above-described variable can be used as follows. When a new lock operation is received, instead of incrementing the ticket number, the locking code changes the active transaction's variable from lock_currently_active to old_lock, and assigns lock_currently_active to the new state object. The lock object may include a pointer to the transaction state object holding the active lock to perform this invalidation efficiently.

In the boolean case, it is possible to throw away the boolean variable altogether and instead use the pointer to the active lock to determine if the transaction has the lock or not. In this case, if the state object is pointed to by the lock, then it is the active transaction, otherwise it is not.

DESCRIPTION OF OPERATIONS INVOLVED IN LOCK CHECKPOINTING

Figure 7:
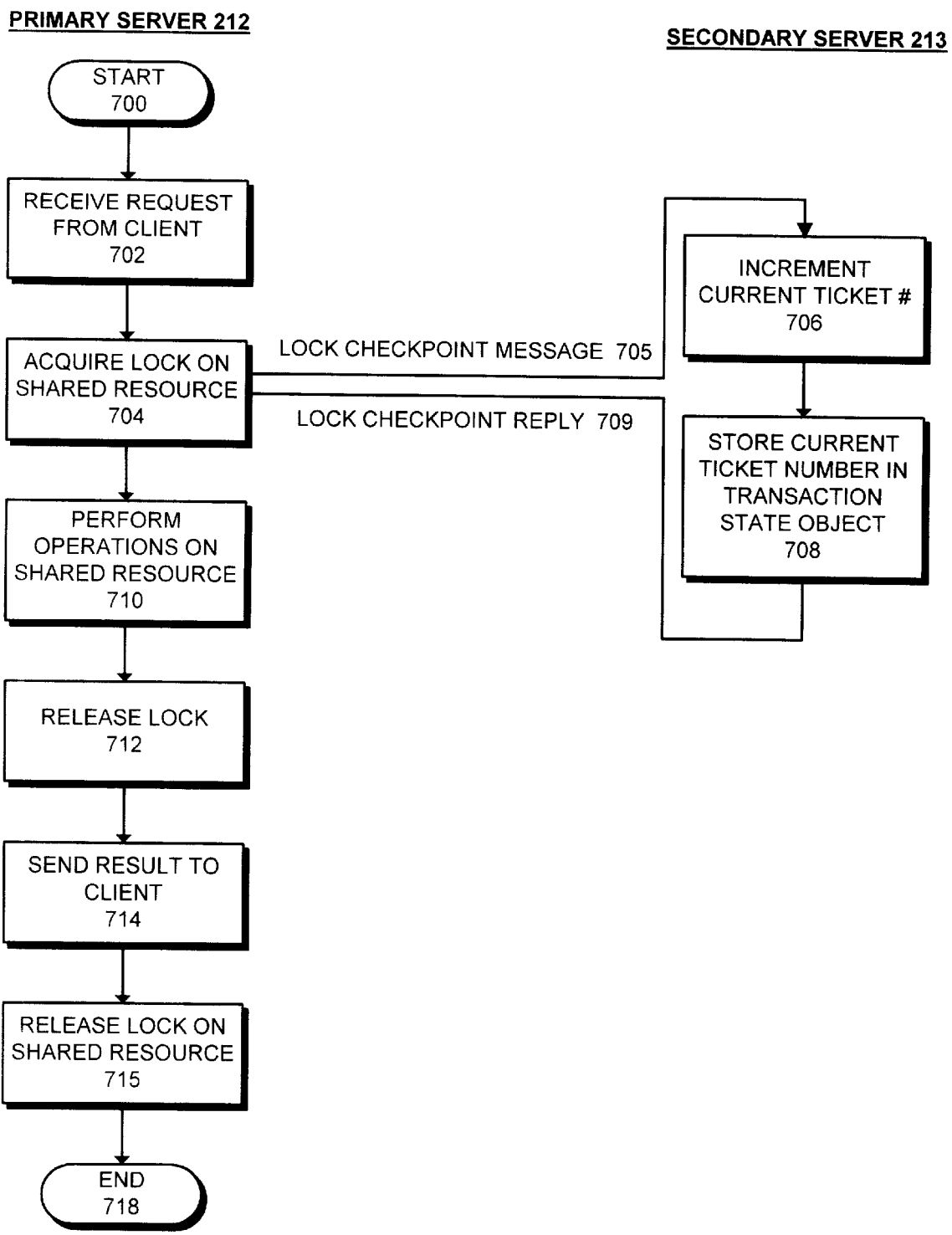
FIG. 7 is a flow chart illustrating some of the operations involved in checkpointing a lock on a shared resource from primary server 212 to secondary server 213 in accordance with an embodiment of the present invention.

FIG. 7 is a flow chart illustrating some of the operations involved in checkpointing a lock on a shared resource from primary server 212 to secondary server 213 in accordance with an embodiment of the present invention. These operations illustrated in FIG. 7 occur during the normal system operation, before a failure of primary server 212 takes place. FIG. 7 is divided into two columns: the left-hand column illustrates operations of primary server 212; and the right hand column illustrates operations of the secondary server 213.

The system starts in state 700 and proceeds to state 702. In state 702, primary server 212 receives a request from a client to process a transaction. The system next proceeds to state 704. In state 704, the primary server 212 acquires a lock on a shared resource involved in the transaction. In doing so, primary server 212 sends lock checkpoint message 705 to secondary server 213. In response to lock checkpoint message 705, secondary server 213 increments current ticket number 624 (from FIG. 6) at state 706, and stores this new current ticket number in an associated state object for the transaction. Secondary server then sends lock checkpoint reply 709 to primary server 212. The system next advances to state 710. In state 710, primary server 212 performs whatever operations are necessary to complete the transaction on the shared resource. The system next advances to state 712. In state 712, the primary server 212 releases its lock on the shared resource. The system next advances to state 714. In state 714, primary server 212 sends a result of the transaction to the client. This may involve additionally sending the result to secondary server 213. (Secondary server 213 will store this result in the saved result field of its associated transaction state object.) Next, the system advances to state 715. In state 715, primary server 212 releases its lock on the shared resource. The system then proceeds to state 718, which is an end state. The above-described process can be repeated for all transactions that require exclusive access to the shared resource.

Figure 8:
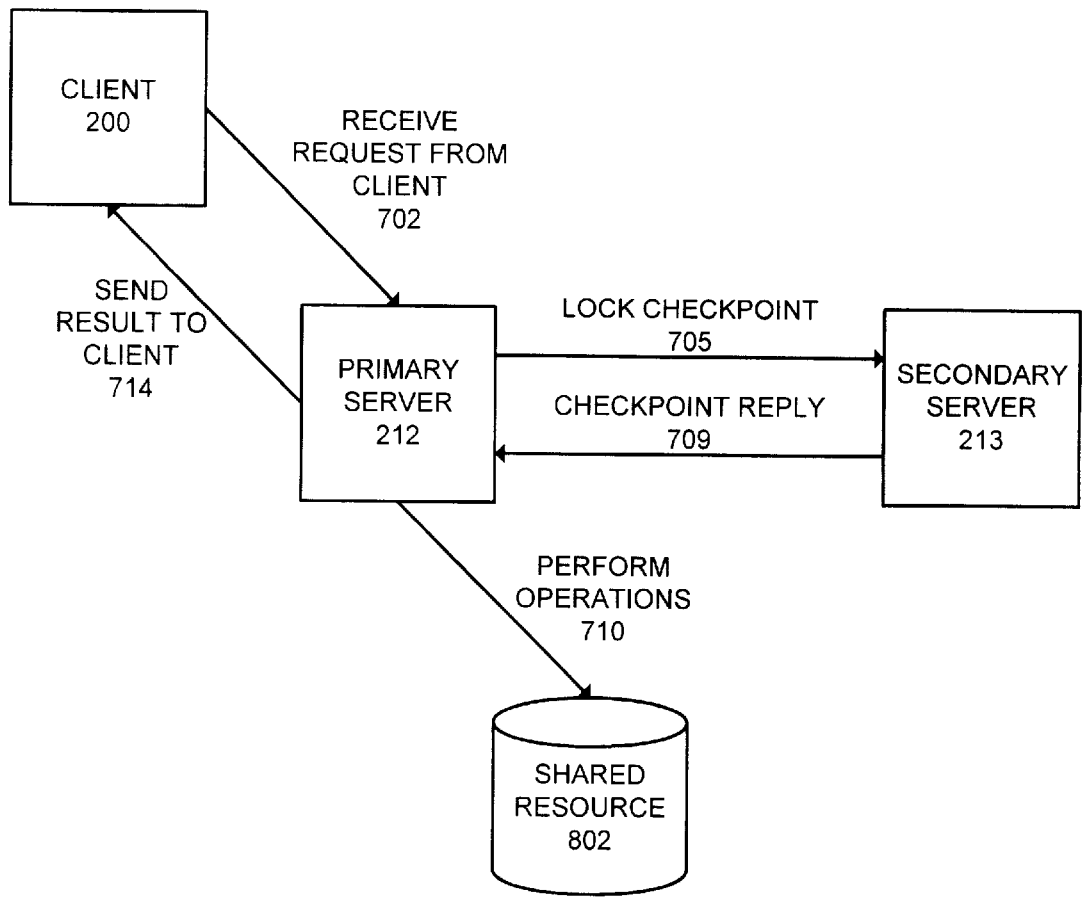
FIG. 8 is a block diagram of information flow between components of a distributed system during some of the operations outlined in FIG. 7 in accordance with an embodiment of the present invention.

Note that primary server 212 also sends a lazy message to secondary server 213 to indicate that the lock is released. In one embodiment, this lazy message is implicitly encoded in a subsequent lock checkpoint message for a subsequent transaction. When secondary server 213 receives this subsequent lock checkpoint message, secondary server 213 knows that the current job must have released its lock FIG. 8 is a block diagram of information flow between components of a distributed system during some of the operations outlined in FIG. 7 in accordance with an embodiment of the present invention. In FIG. 8, primary server 212 first receives a request from client 200 (in state 702 from FIG. 7). After acquiring a lock on the shared resource, primary server 212 sends lock checkpoint message 705 to secondary server 213 and receives lock checkpoint reply 709. After performing operations on shared resource 802 (in state 710), primary server 212 sends a result to client 200 (in state 714). A mentioned above, primary server 212 may additionally send the result to secondary server 213.

DESCRIPTION OF HANDLING OF RETRY REQUESTS

Figure 9:
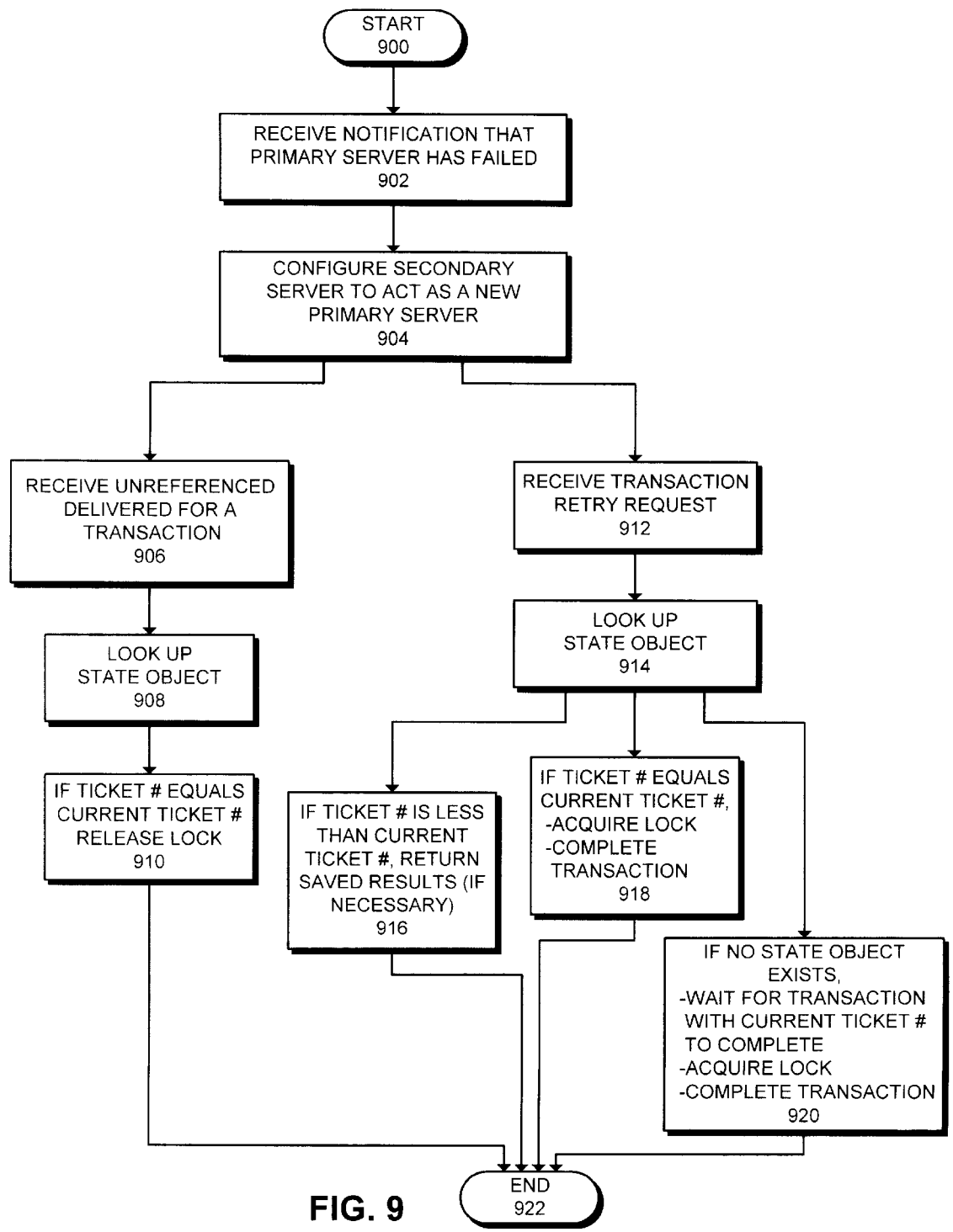
FIG. 9 is a flow chart illustrating some of the operations involved in handling retry requests at secondary server 213 in the event of a failure of primary server 212 in accordance with an embodiment of the present invention.

FIG. 9 is a flow chart illustrating some of the operations involved in handling retry requests at secondary server 213 in the event of a failure of primary server 212 in accordance with an embodiment of the present invention. The system starts at state 900 and proceeds to state 902. In state 902, secondary server 213 receives notification that primary server 212 has failed. The system proceeds to state 904. In state 904, secondary server 213 is configured to act as a new primary server for the shared resource. At state 904, two things can happen. If secondary server 213 receives an "unreferenced" message on a transaction, the system proceeds to state 906. If secondary server 213 receives a retry request from a client, the system proceeds to state 912.

In state 906, secondary server 213 received an "unreferenced" message for the transaction. This indicates that the client that initiated the transaction no longer needs a reply for the transaction, because the client has either sent a lazy message indicating the reply was received, or the client is unresponsive and possibly dead. In either case, the system proceeds to state 908. In state 908, secondary server 213 looks up a transaction state object using the transaction ID in lookup structure 630. The system next proceeds to state 910. In state 910, if the ticket number in the transaction state object equals the current ticket number, the transaction presently holds exclusive access to the shared resource, however, the client that initiated the transaction no longer requires the result. In this case, secondary server 213 releases the lock on the shared resource so that other transactions can proceed. Next, the system proceeds to state 922, which is an end state.

In state 912, the secondary server 213 receives a transaction retry request from a former client of primary server 212. The system proceeds to state 914. In state 914, the system uses the transaction ID in the retry request to look up an associated transaction state object. From state 914, secondary server 213 can do a number of things.

If the ticket number in the transaction state object is less than current ticket number 624, this means the transaction has completed on the primary server, but for some reason the associated client has not received a reply. In this case, the system proceeds to state 916 in which secondary server 213 returns a saved result from the state object to the client. In one embodiment of the present invention, the saved result is passed from primary server 212 to secondary server 213 only if the saved result indicates something other than a normal completion of the transaction. This saves an extra communication for the common case where the transaction completed normally. The system next proceeds to state 922, which is an end state.

If the ticket number in the transaction state object is equal to current ticket number 624, the transaction must currently have exclusive access to the shared resource. In this case, the system proceeds to state 918, in which secondary server 213 acquires a lock on the shared resource and completes the transaction. After the transaction is complete, primary locked flag 626 (from FIG. 6) is cleared. This enables transactions that waiting for exclusive access to the shared resource to proceed. The system next proceeds to state 922, which is an end state.

If no state object exists for the transaction ID in lookup structure 630, this indicates that the associated transaction has not gained exclusive access to the shared resource. In this case, the system proceeds to state 920. In state 920, the associated transaction waits for the current transaction, which holds the current ticket number, to complete. When the current transaction completes (or possibly fails), the associated transaction acquires a lock on the shared resource and completes its requisite processing. The system next proceeds to state 922, which is an end state.

While the invention has been particularly shown and described with reference to embodiments thereof, those skilled in the art will understand that the foregoing and other changes in form and detail may be made therein without departing from the spirit and scope of the present invention.

What is claimed is:

1. A method for providing highly available operation locks, the method operating in a distributed system including a primary server having a client and a secondary server for a shared resource, the method comprising:

receiving, at the secondary server, a message from the primary server indicating that a first operation from the client on the primary server has acquired exclusive access to the shared resource;

updating a replicated mutual exclusion variable, at the secondary server, to indicate that the first operation has exclusive access to the shared resource;

receiving, at the secondary server, notification that the primary server has failed;

configuring the secondary server to act as a new primary server;

receiving, at the new primary server, an operation retry request from the client; and if the operation retry request is for the first operation, acquiring exclusive access to the shared resource by updating the replicated mutual exclusion variable, and completing the first operation.

2. The method of claim 1, further comprising if the operation retry request is for one of the prior operations, returning to the client a saved result if the client has not received such saved result.

3. The method of claim 1, further comprising if the operation retry request is for one of the prior operations, returning to the client a saved result, if such saved result is other than a normal operation completion indicator.

4. The method of claim 1, further comprising if the operation retry request is for other than the first operation and the prior operations, waiting for an operation that currently has exclusive access to the shared resource to complete before processing the operation retry request.

5. The method of claim 1, further comprising:

receiving a notification that a first client is unresponsive and possibly dead after the secondary server is configured to act as the new primary server; and if the first client initiated the first operation, releasing the exclusive access to the shared resource held by the first operation.

6. The method of claim 1, further comprising:

receiving an indication, at the secondary server, that the client has received a reply for the first operation; and updating state information, at the secondary server, to indicate that the client has received the reply.

7. The method of claim 6, wherein updating state information to indicate that the client has received the reply includes discarding state information associated with the first operation.

8. The method of claim 1, wherein updating the replicated mutual exclusion variable to indicate that the first operation has exclusive access to the share resource indicates that prior operations have completed their exclusive accesses to the shared resource.

9. The method of claim 1, further comprising:

receiving an indication, at the secondary server, that the first operation has released its exclusive access to the shared resource; and updating the replicated mutual exclusion variable to indicate that the first operation has released its exclusive access.

10. The method of claim 1, wherein the shared resource includes secondary storage.

11. The method of claim 1, wherein the shared resource includes a directory in a file system.

12. The method of claim 1, wherein the first operation includes a file system operation.

13. The method of claim 1, wherein the first operation includes a transaction.

14. A method for providing highly available operation locks, the method operating in a distributed system including a primary server having a client and a secondary server for a shared resource, the method comprising:

receiving, at the secondary server, a message from the primary server indicating that a first operation from the client on the primary server has acquired exclusive access to the shared resource;

updating a replicated mutual exclusion variable, at the secondary server, to indicate that the first operation currently has exclusive access to the shared resource;

receiving, at the secondary server, notification that the primary server has failed;

configuring the secondary server to act as a new primary server;

receiving, at the new primary server, an operation retry request from the client;

if the operation retry request is for one of the prior operations, returning to the client a saved result if the client has not received such saved result;

if the operation retry request is for the first operation, acquiring exclusive access to the shared resource by updating the replicated mutual exclusion variable, and completing the first operation; and if the operation retry request is for a second operation, that is other than the first operation and the prior operations, waiting for an operation that currently has exclusive access to the shared resource to complete before processing the second operation.

15. The method of claim 14, further comprising:

receiving a notification that a first client is unresponsive and possibly dead after the secondary server is configured to act as the new primary server; and if the first client initiated the first operation, releasing the exclusive access to the shared resource held by the first operation.

16. The method of claim 14, further comprising:

receiving an indication, at the secondary server, that the first operation has completed and the client has received a corresponding reply; and discarding state information associated with the first operation.

17. A program storage device storing instructions that when executed by a computer perform a method for providing highly available operation locks, the method operating in a distributed system including a primary server having a client and a secondary server for a shared resource, the method comprising:

receiving, at the secondary server, a message from the primary server indicating that a first operation from the client on the primary server has acquired exclusive access to the shared resource;

updating a replicated mutual exclusion variable, at the secondary server, to indicate that the first operation has exclusive access to the shared resource;

receiving, at the secondary server, notification that the primary server has failed;

configuring the secondary server to act as a new primary server;

receiving, at the new primary server, an operation retry request from the client; and if the operation retry request is for the first operation, acquiring exclusive access to the shared resource by updating the replicated mutual exclusion variable, and completing the first operation.

18. A computer instruction signal embodied in a carrier wave carrying instructions that when executed by a computer perform a method for providing highly available operation locks, the method operating in a distributed system including a primary server having a client and a secondary server for a shared resource, the method comprising:

receiving, at the secondary server, a message from the primary server indicating that a first operation from the client on the primary server has acquired exclusive access to the shared resource;

updating a replicated mutual exclusion variable, at the secondary server, to indicate that the first operation has exclusive access to the shared resource;

receiving, at the secondary server, notification that the primary server has failed;

configuring the secondary server to act as a new primary server;

receiving, at the new primary server, an operation retry request from the client; and if the operation retry request is for the first operation, acquiring exclusive access to the shared resource by updating the replicated mutual exclusion variable, and completing the first operation.

19. An apparatus that provides highly available operation locks, comprising:

a secondary server for a shared resource, the secondary server acting as a backup for a primary server for the shared resource;

an exclusive access logging mechanism, at the secondary server, that receives a message from the primary server indicating that a first operation on the primary server has acquired exclusive access to the shared resource, and updates a replicated mutual exclusion variable to indicate that the first operation currently has exclusive access to the shared resource and that any prior operations have completed their exclusive accesses to the shared resource;

a failover mechanism, on the secondary server, that receives a notification that the primary server has failed, and configures the secondary server to act as a new primary server for the shared resource; and a retry processing mechanism, on the new primary server, that receives an operation retry request from a client of the primary server, and if the operation retry request is for the first operation, acquires exclusive access to the shared resource by updating the replicated mutual exclusion variable, and completes the first operation.

20. The apparatus of claim 19, wherein the retry processing mechanism is configured to return to the client a saved result if the operation retry request is for one of the prior operations and the client has not received such saved result.

21. The apparatus of claim 19, wherein the retry processing mechanism is configured to return to the client a saved result if the operation retry request is for one of the prior operations and if such saved result is other than a normal operation completion indicator.

22. The apparatus of claim 19, wherein the retry processing mechanism is configured to wait for an operation that currently has exclusive access to the shared resource to complete before processing the operation retry request if the operation retry request is for other than the first operation and the prior operations.

23. The apparatus of claim 19, further comprising a shared resource locking mechanism, within the new primary server, that is configured to release the first operation's exclusive access to the shared resource, if a notification is received that the client is unresponsive and possibly dead after the secondary server is configured to act as the new primary server.

24. The apparatus of claim 19, wherein the retry processing mechanism is configured to receive an indication that the client has received a reply for the first operation, and to update state information to indicate that the client has received the reply.

25. The apparatus of claim 19, wherein the retry processing mechanism is configured to receive an indication that the client has received a reply for the first operation, and to discard state information associated with the first operation.

26. The apparatus of claim 19, wherein the retry processing mechanism is configured to receive an indication that the first operation has released its exclusive access to the shared resource, and to update the replicated mutual exclusion variable to indicate that the first operation has released its exclusive access.

27. The apparatus of claim 19, wherein the shared resource includes secondary storage.

28. The apparatus of claim 19, wherein the shared resource includes a directory in a file system.

29. The apparatus of claim 19, further comprising the primary server and the client.

30. The apparatus of claim 19, wherein the first operation includes a file system operation.

31. The apparatus of claim 19, wherein the first operation includes a transaction.

32. A method for providing highly available operation locks, the method operating in a distributed system including a primary server having a client and a secondary server for a shared resource, the method comprising:

receiving, at the secondary server, a message from the primary server indicating that a first operation from the client on the primary server has acquired exclusive access to the shared resource;

updating a replicated mutual exclusion variable, at the secondary server, to indicate that the first operation has exclusive access to the shared resource; and configuring the secondary server to act as a new primary server upon receiving notification that the primary server has failed.

33. An apparatus that provides highly available operation locks, comprising:

a secondary server for a shared resource, the secondary server acting as a backup for a primary server for the shared resource;

an exclusive access logging mechanism, at the secondary server, that receives a message from the primary server indicating that a first operation on the primary server has acquired exclusive access to the shared resource, and updates a replicated mutual exclusion variable to indicate that the first operation currently has exclusive access to the shared resource and that any prior operations have completed their exclusive accesses to the shared resource; and a failover mechanism, on the secondary server, that receives a notification that the primary server has failed, and configures the secondary server to act as a new primary server for the shared resource.

* * * * *